UNITED STATES PATENT OFFICE.

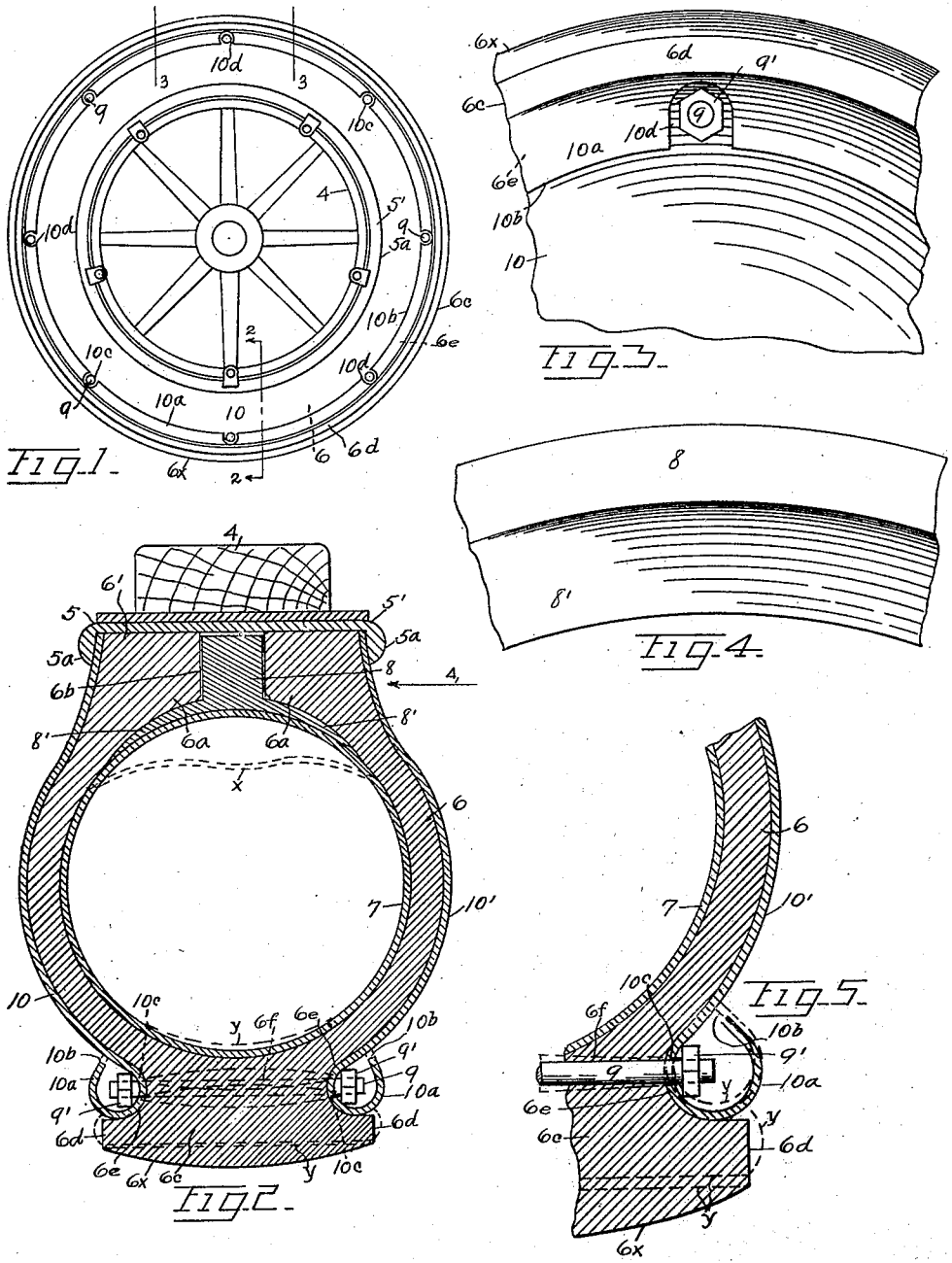

JAMES B. LYNCH, OF SYRACUSE, NEW YORK.

NON-COLLAPSIBLE TIRE.

1,398,700.  Specification of Letters Patent.  Patented Nov. 29, 1921.

Application filed June 14, 1921. Serial No. 477,375.

*To all whom it may concern:*

Be it known that I, JAMES B. LYNCH, a citizen of the United States, residing at Syracuse, in the county of Onondaga and State of New York, have invented certain new and useful Improvements in Non-Collapsible Tires, of which the following is a specification.

This invention relates to a new construction and arrangement of automobile tires, to take the place of the well known pneumatic tires, and has for its object to provide a tire of the class, which cannot be punctured, and which is not liable to collapse or flatten, when the pneumatic parts fail, due to the loss of the air through leakage, or by the bursting of the inner tube. A further object is to provide a relatively thin spring-metal casing consisting of similar interchangeable annular sections, which are snugly fitted to the opposite bulging sides of the common rubber-fabric shoe, which envelops and protects the inflatable inner-tube; the said sections conforming to and being held in place by the wheel rims, and being so constructed and arranged as to provide a medial annular opening between the peripheral margins of the sections, to receive a resilient peripherally arranged rib of the shoe, which projects beyond the free outer margins of the metal sections and forms the constant tread of the wheel. The peripheral margins of the metal sections are rolled into flexible beads, and the lateral margins of the resilient tread of the shoe overlap and rest upon the said beads. This prevents the tire from collapsing or flattening in case the pneumatic cushion fails. This peculiar and novel construction and arrangement of the metal casing and tread portion of the shoe permits the automobile to be driven to its destination without injury to the wheel or discomfort to the occupants of the car, because the entire weight of the car and its load is resiliently supported by the coöperating spring-metal sections and the over-spreading cushion rubber tread. And a further object is to provide novel flexible means for tying the tread and the beaded margins of the metal sections together, for preventing the accidental spreading and the consequent distorting and injuring of the said parts.

The various features and parts of the invention will be understood from the detailed description which follows, and by reference to the accompanying drawing, in which—

Figure 1 is a side elevation of a vehicle wheel, to which my invention is applied. Fig. 2 is an enlarged transverse sectional view, taken on line 2—2 of Fig. 1. Fig. 3 is an enlarged broken face view, taken between the lines 3—3 of Fig. 1. Fig. 4 is an enlarged broken elevation of the resilient annular flap-guard which closes the gap between the inner margins of the shoe, as viewed in the direction of the arrow 4 in Fig. 2. And Fig. 5 is an enlarged fragmentary section of parts shown in Fig. 2.

In the drawing 4 represents the felly of a vehicle wheel, which supports the well-known demountable rim consisting of the usual fixed portion 5, and a removable portion 5', and both of the said parts being provided with the usual annular clenching portions $5^a$.

6 represents the usual hollow rubber-fabric shoe common to pneumatic tires, whose inner circumference 6' is split for providing similar normally spaced flanges $6^a$, which may be suitably flexed and spread for the insertion of the usual inflatable inner tube 7. The inner margins 6' of the shoe rest upon the rim, and the flanges $6^a$ are loosely received between the clenchers $5^a$. After the tube 7 is placed in the shoe, the gap $6^b$, between the flanges $6^a$, is closed by an annular rubber or other resilient part 8, which serves to properly space said flanges, and prevents any portions of the tube 7 when inflated, from being forced into the gap. The ring 8 is provided with an integral flap 8', which overlaps the adjacent inner curved surfaces of the shoe, as best seen in Fig. 2, for supporting the inner tube and preventing the same from being pinched between and injured by the parts $6^a$ and 8. The periphery of the shoe 6 is provided with a relatively broad and thick annular tread $6^c$, which is preferably composed of resilient cushion rubber and is rigid to the main body of the shoe. The wearing surface $6^x$ of the tread $6^c$ is curved, and the said curve is preferably shallower than that of the normal periphery of the shoe, and the said tread is formed with laterally projecting margins $6^d$, for providing similar annular recesses or sockets $6^e$, and the base of said tread is perforated transversely at intervals, as at $6^f$, to receive ties 9, which are adapted to flex toward and away from the axis of the wheel, corresponding to the resilient action of the tread 6, as indicated by dotted lines in Figs. 2 and 5.

The metal casing comprises similar sections 10—10′ which protect the shoe from puncture and injury by abrasions, as well as from blowing-up. These sections are annular and preferably consist of relatively light-gage spring-steel, which conform to the outer contour of the shoe. The inner circumferential edges of the metal sections are preferably plain, and are disposed between the flanges 6ª and the clencher portions 5ª, the latter holding the sections rigidly in place. The peripheral margins of the sections 10—10′ are formed into beads 10ª, which are preferably slightly open, as at 10ᵇ, to allow said beads to flex corresponding to the resilient action of the tread 6ᶜ, as shown by the dotted lines in Figs. 2 and 5. The beads 10ª are received in the semi-circular sockets 6ᵉ of the shoe, and support and protect the laterally projecting margins 6ᵈ of the tread, with which they are in constant engagement. The facing portions of the beads 10ª are perforated, as at 10ᶜ, to receive the projecting threaded ends of the ties 9, and nuts 9′ are applied to said ends for drawing and holding the beads in the socket 6ᵉ (see Figs. 2, 3 and 5). The corresponding outer surfaces of the beads 10ª are cut away, as at 10ᵈ, to facilitate applying and removing the nuts 9′.

The lateral arched portions of the steel sections, as well as the beaded margins, are intended to flex and bend under the influence of the air pressure of the inner tube, and the tension of the metal is such that the said margins preferably tend to approach each other, thereby insuring a constant pressure against the opposite sides of the treads 6ᶜ, for preventing dirt or water from entering between the shoe and the sections.

The interior of the shoe, as well as the inner-tube, while the tube is inflated, are maintained substantially circular, as shown in Fig. 2. When, however, the tire becomes deflated, due to the leakage of the air, or from the bursting of the inner-tube, the said tube tends to collapse, as indicated by the dotted lines $x$ in Fig. 2. Whenever the air pressure drops below the normal, the tread portion 6ᶜ of the shoe and the adjacent margins of the casing tend to flatten, as shown by the dotted lines $y$, in Fig. 2. This flattening however, is so slight that the occupants of the car do not feel its effects, and as the tire, owing to the peculiar and novel arrangement of the shoe and the bead-margins 10ª, cannot flatten to a greater extent than that shown, the car may be safely driven to its destination with deflated tires, without danger of injuring either the tires or the wheels. When the tires are properly constructed, the wheels have practically the same appearance and resilience, and the occupants of the car enjoy substantially the same comforts, whether the tires are inflated or deflated. This non-collapsible feature of my tire is attained by the novel provision and arrangement of the over-hanging lateral margins 6ᵈ of the tread and the beads 10ª, which are flexibly connected at frequent intervals around the tire by the ties 9.

Having thus described my invention, what I claim is—

1. A non-collapsible vehicle tire including an inner tube, a shoe covering said tube and having an annular tread rib, the said rib being provided with similar integral laterally extending margins for providing similar oppositely facing annular recesses, and a spring-metal casing forming a protecting envelop for said shoe composed of similar circular sections, the peripheral margins of said sections being rolled for forming beads which are received in said recesses and which resiliently support the external lateral margins of the tread rib and prevent collapsing of the shoe.

2. A non-collapsible vehicle tire including an inner tube, a shoe covering said tube and having an annular tread rib, the said tread being provided with similar integral overhanging lateral margins for providing similar annular recesses adjacent the medial portion of said rib, and a spring-metal casing forming a protecting envelop for said shoe composed of similar circular sections, the peripheral margins of said sections being rolled into continuous beads which are disposed in said recesses and resiliently supporting the extended lateral margins of the tread rib, and independent flexible means for holding said beaded margins in place.

3. The combination with the pneumatic tube and the demountable rim of an automobile tire, of a shoe inclosing said tube and being supported by said rim, said shoe having a resilient annular rib formed with similar lateral edges overhanging the said rib and the edges being integral with the rib and the shoe, for providing similar oppositely facing annular sockets, a hollow spring-metal casing composed of similar annular half-sections, the inner circumferential margins of said sections being held in place by said rim, the peripheral margins of said sections being rolled for providing annular beads which engage said sockets and flexibly support the overhanging margins of said rib.

4. The combination with the pneumatic tube, of a flexible shoe covering said tube, said shoe having an integral resilient annular rib, the lateral margins of said rib being extended for providing similar oppositely facing annular sockets, a hollow spring-metal casing comprising similar circular sections which closely contact with the opposite bulging sides of the shoe, the peripheral margins of said sections being rolled into annular beads which conform to and engage said sockets and resiliently support the extended lateral margins of said rib, the tension of said sections adapted to normally hold said beads in said sockets for preventing the collapsing or flattening of the tire when the pneumatic tube becomes deflated, and means for maintaining the circularity of the inner tube while the latter is inflated.

5. An automobile tire comprising a hollow spring-metal casing consisting of similar annular sections having their peripheral margins normally spaced apart and rolled for providing beads adapted to flex when pressure is applied radially, the inner circumferential margins of said sections adapted to be clenched by portions of a demountable rim, an inflatable inner tube, and a flexible shoe covering said tube, said shoe having an annular tread rib extending through and beyond the beaded margins of said sections, the said tread having integral lateral margins which overspread and rest upon said beads, said tread and said beads adapted to flex radially for resiliently supporting the automobile, and said tread and said beads adapted to coöperate for preventing the collapsing or flattening of the tire when the inner tube becomes deflated.

In testimony whereof I affix my signature.

JAMES B. LYNCH.